(12) United States Patent
Sharma et al.

(10) Patent No.: US 7,788,424 B2
(45) Date of Patent: *Aug. 31, 2010

(54) METHOD OF TRANSMITTING DATA FROM A TRANSMITTING DEVICE

(75) Inventors: Sanjeev K. Sharma, Herndon, VA (US); Anup Bansal, Herndon, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,737

(22) Filed: Oct. 27, 2009

(65) Prior Publication Data

US 2010/0049884 A1    Feb. 25, 2010

Related U.S. Application Data

(62) Division of application No. 12/010,898, filed on Jan. 31, 2008, now Pat. No. 7,644,200, which is a division of application No. 11/066,307, filed on Feb. 28, 2005, now Pat. No. 7,444,443.

(51) Int. Cl.
*G06F 13/24* (2006.01)
*H04G 7/24* (2006.01)

(52) U.S. Cl. .................. 710/30; 710/5; 710/6; 710/34; 709/227; 709/228; 714/748; 714/749; 714/776; 370/235; 370/394; 370/409; 370/471; 370/338

(58) Field of Classification Search .............. 710/5, 710/6, 30, 34; 709/227, 228; 714/748, 749, 714/776; 370/235, 394, 409, 338, 471
See application file for complete search history.

(56) References Cited

U.S. PATENT DOCUMENTS

| | | | |
|---|---|---|---|
| 5,058,108 A | 10/1991 | Mann et al. | |
| 6,182,135 B1 | 1/2001 | Ruane et al. | |
| 6,546,425 B1 | 4/2003 | Hanson et al. | |
| 6,587,935 B2 | 7/2003 | Ofek | |
| 6,765,869 B2 | 7/2004 | Chintada et al. | |
| 7,290,195 B2 * | 10/2007 | Guo et al. | 714/749 |
| 7,304,975 B2 * | 12/2007 | Shvodian | 370/338 |
| 7,395,481 B2 | 7/2008 | Chintada et al. | |
| 2001/0024434 A1 | 9/2001 | Ayyagari et al. | |

(Continued)

OTHER PUBLICATIONS

International Search Report of the International Searching Authority of the PCT for corresponding International Application No. PCT/US 06/07121 dated Dec. 5, 2007.

(Continued)

*Primary Examiner*—Tammara Peyton

(57) ABSTRACT

A method is provided for transmitting data from a transmitting device (121) to a receiving device (125). The transmitting device transmits a first data frame (200) to a receiving device a first time ($310_0$). Then it consecutively transmits the first data frame to the receiving device second through $N^{th}$ times ($310_1$-$310_N$), each of second through $N^{th}$ first data frame transmissions being made a first predetermined time period (350) after a respective previous first data frame transmission. After this, the transmitting device transmits a second data frame (200) to the receiving device a second predetermined time period (360) after the $N^{th}$ first data frame transmission. In this method, N is an integer greater than 1, and the second predetermined time period is less than the first predetermined time period.

20 Claims, 4 Drawing Sheets

U.S. PATENT DOCUMENTS

2002/0089959 A1  7/2002  Fischer et al.
2003/0210710 A1  11/2003  Odman
2004/0187068 A1  9/2004  Chintada et al.
2007/0198789 A1  8/2007  Clark et al.

OTHER PUBLICATIONS

Written Opinion of the International Searching Authority of the PCT for corresponding International Application No. PCT/US 06/07121 dated Dec. 5, 2007.

* cited by examiner

METHOD OF TRANSMITTING DATA FROM A TRANSMITTING DEVICE

CROSS REFERENCE TO RELATED APPLICATIONS

This application a divisional application of U.S. patent application Ser. No. 12/010,898 filed on Jan. 31, 2008 entitled "METHOD OF REPEATING DATA TRANSMISSION BETWEEN NETWORK DEVICES BY TIMING A FIRST PREDETERMINED PERIOD AFTER PREVIOUS FIRST DATA TRANSMISSION", which is a divisional application of U.S. patent application Ser. No. 11/066,307 filed on Feb. 28, 2005 entitled "METHOD OF REPEATING DATA TRANSMISSION BETWEEN NETWORK DEVICES BY TIMING A FIRST PREDETERMINED PERIOD AFTER PREVIOUS FIRST DATA TRANSMISSION".

FIELD OF THE INVENTION

The present invention relates in general to the transmission of data frames between remote devices, and more particularly to a method of a transmitting device repeating the transmission of data frames according to a pattern of allowable retry attempts.

BACKGROUND OF THE INVENTION

In a wired or wireless network in which data is sent from one device to another, it is necessary to provide for the situation in which packets or frames of data sent from one device are not successfully received by the device they were intended for. This can be caused by any number of reasons including channel quality, receiver errors, and transmitter errors.

Because of this very real possibility of broken communication links, many networks provide a mechanism by which a receiving device can indicate to a transmitter whether the data transmission was successful. One such mechanism is the acknowledgement frame, which can be sent by a receiver device back to the transmitting device as a receive receipt for a data frame. Thus, after a transmitting device (also called the source device) successfully sends a data frame to a receiving device (also called a destination device), the destination device may send an acknowledgement frame to the source device.

Providing the source device successfully receives the acknowledgment frame (which may be subject to the same transmission difficulties as a data frame), the source device will have a solid indicator that the data was not only sent, but was received.

Absent receiving an acknowledgment of transmission, the source device will remain uncertain as to whether the data indeed was successfully received. In such cases, the relevant protocol may provide a way for the source device to resend the data to the destination device in an effort to successfully pass it through.

Of course, if the source device were allowed to keep trying indefinitely to resend a data frame, the data transmission could get frozen on a single frame. As a result, many protocols will provide for a maximum number of times that a source device can retry sending a particular data frame before that attempt is considered a failure. Once a failure is indicated, the system can then take the necessary steps to address the problem. This could include changing transmission parameters to achieve a better connection, ignoring the data frame if it was not critical, or providing a user with an error message.

Of course, for each retry attempt, the source device must devote a certain amount of time to listening for an acknowledgement from the destination device before it can resend the data frame. This time would at a minimum be the round trip transmission time between the source and destination devices, plus a processing time at the destination device. If the network has only a single channel then that channel cannot transmit data during this acknowledgement waiting period.

As the number of retry attempts increases, this will serve to reduce the network's data rate by taking time away from data transmission and allocating it to waiting for acknowledgements.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Wireless Network

Figure 1:
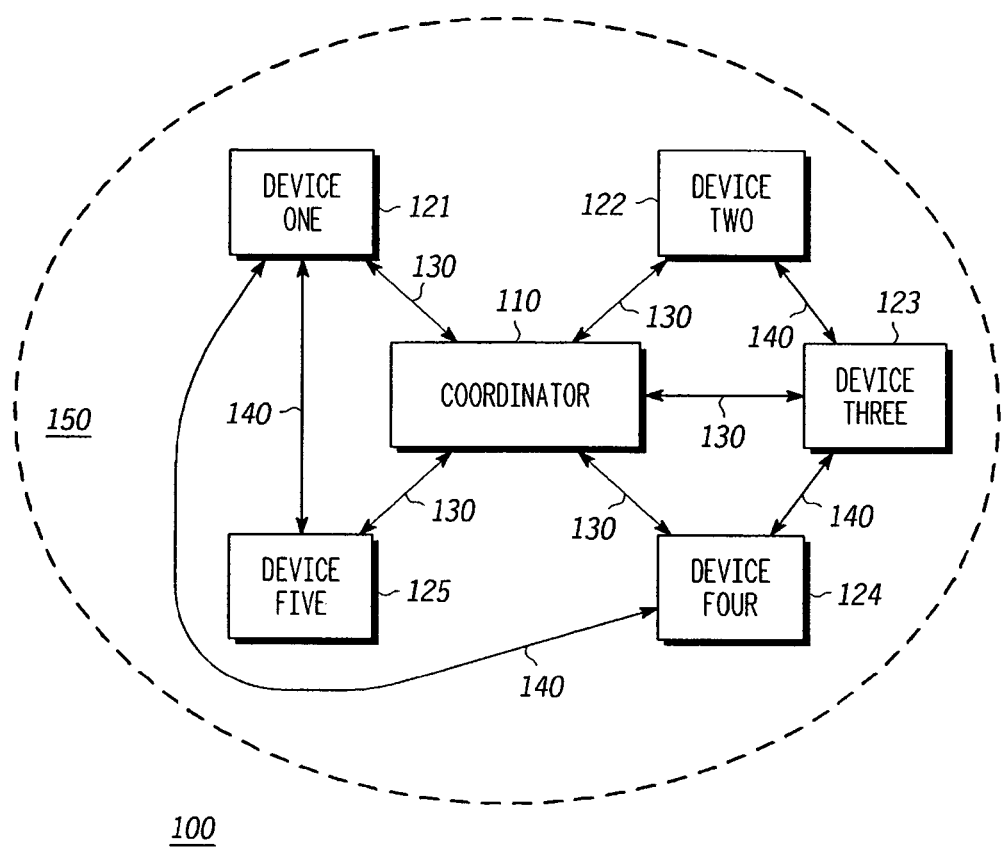
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wired or wireless network.

When the term piconet is used, it refers to a wireless network of devices connected in an ad hoc fashion, having one device act as a coordinator (i.e., it functions as a master) while the other devices (sometimes called stations) follow the time allocation instructions of the coordinator (i.e., they function as slaves). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of devices 121-125. The coordinator 110 serves to control the operation of the network 100. As noted above, the system of coordinator 110 and devices 121-125 may be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121-125, except with the additional functionality for coordinating the system, and the requirement that it communicates with every device 121-125 in the network 100. In other embodiments the coordinator 110 may be a separate designated control unit that does not function as one of the devices 121-125.

In some embodiments the coordinator 110 will be a device just like the non-coordinator devices 121-125. In other embodiments the coordinator 110 could be a separate device dedicated to that function. Furthermore, individual non-coordinator devices 121-125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, or other personal wireless device.

The various non-coordinator devices 121-125 are confined to a usable physical area 150, which is set based on the extent to which the coordinator 110 can successfully communicate with each of the non-coordinator devices 121-125. Any non-coordinator device 121-125 that is able to communicate with the coordinator 110 (and vice versa) is within the usable area 150 of the network 100. As noted, however, it is not necessary for every non-coordinator device 121-125 in the network 100 to communicate with every other non-coordinator device 121-125.

Although a wireless network is described with reference to FIG. 1, and the disclosure refers to this wireless network by way of example, the current claimed invention is equally applicable to wired networks. By way of example the present claimed invention could be applied to wireless networks of the sort defined by the IEEE 802.11 standard or the IEEE 803.15.3 standard, the proposed IEEE 802.15.3b standard, by a wired Ethernet network, or by any other suitable wired or wireless network.

Frames

Figure 2:
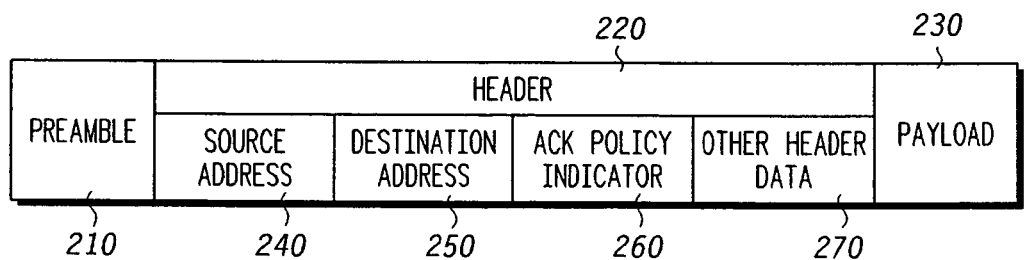
FIG. 2 is a block diagram of a frame according to a disclosed embodiment of the present invention.

FIG. 2 is a block diagram of a frame according to a disclosed embodiment of the present invention. The frame 200 disclosed in FIG. 2 can serve as either a data frame or an acknowledgement (ACK) frame.

For ease of disclosure this application will refer to information passing in frames. However, this terminology is not intended to be restrictive. Information can be broken up into a variety of forms for transmission and these forms can have a variety of names, including frames, packets, etc. Regardless of the name used for a quantum of information, and the particular format of that information, the present claimed invention can be used to retransmit the resulting framework.

Each frame 200 is preferably made up of a series of wavelets (or radio symbols), with information in the frame 200 being represented by the wavelets or groups of wavelets. As shown in FIG. 2, the frame 200 may include a preamble 210, a header 220, and a payload 230. The header 320 can include a source address 240, a destination address 250, acknowledgement policy indicator 260, and other header data 270.

The preamble 210 is a known sequence of bits used to allow a destination properly lock onto the signal. No substantive data is sent in the preamble 210, since the destination device is still getting its timing synchronized with that of the transmitting device while the preamble 210 is being sent.

The header 220 includes information about the device transmitting the frame 200 (i.e., the source device), the intended recipient of the frame 200 (i.e., the destination device), what kind of acknowledgment policy the frame is using, and other identifying information.

In particular, the source address 240 identifies the device transmitting the frame 200 and the destination address 250 identifies the intended recipient of the frame 200. The destination address 250 may identify a single device 110, 121-125 or may identify two or more devices 110, 121-125 at the same time (e.g., a multicast address or a broadcast address). These device addresses can be done by MAC address, network address, or any other suitable method.

The acknowledgement policy indicator 260 identifies the acknowledgement policy that will be employed for data frame transmission. This could be a policy of immediate acknowledgement (immediate-ACK), a policy of no acknowledgement (no-ACK), or a policy of delayed acknowledgement (delayed-ACK). In some alternate embodiments delayed acknowledgement is referred to as block-ACK, burst-ACK, or group-ACK.

When using an immediate-ACK policy, the destination device sends an immediate acknowledgement frame upon successful receipt of a data frame. When using a no-ACK policy, the destination device sends no acknowledgement frames regardless of whether a data frame is successfully received. And when using a delayed-ACK policy, the destination device sends an acknowledgment indicating successful receipt of a data frame, but delays the transmission of such an acknowledgement until a scheduled time or until a certain number of frames are successfully received.

The other header data 270 could include information such as payload rate, an indicator as to whether a device has more data to transmit, a frame type, sequence number, fragment number, frame length, stream index, protocol version, acknowledgement policy, etc.

The payload 230 includes any substantive information that needs to be transmitted by the frame 200. This can be data if the frame is a data frame, management information if it is a management frame, etc.

Every frame 200 will always include an entry for source address 240, destination address 250, and an acknowledgement policy indicator 260. However, not every frame 200 will have a payload 230. For example, data frames will have a payload, while acknowledgement frames generally will not. Since an acknowledgement frame is used to provide an indication that a frame 200 has been successfully received, its very existence implicitly provides the information it must pass, i.e., that the previous frame 200, was successfully received. As such, it generally does not need a separate payload.

Data Frame Retry

As noted above, some protocols allow a network to resend failed data frames. For example, the proposed IEEE 802.15.3b standard provides for a programmable retry limit. Using this retry provision, each time a data frame is transmitted, it is sent with an immediate-ACK policy. This means that the destination device will immediately acknowledge successful receipt of the data frame by sending an acknowledgement frame. If the data frame is not acknowledged, the source device can resend the data frame, up to the retry limit. In the 802.15.3 standard the initial transmission is considered the $0^{th}$ transmission, meaning that the data frame can actually be sent a total number of times equal to the retry limit plus one. Alternate embodiments could consider the first attempt to send a data frame as the first transmission.

If the source device exhausts its allowed number of retry attempts, the data frame transmission is considered to have failed, and the source device will process the current data frame accordingly. This might include discarding the data frame if that is permissible or rescheduling the frame to be delivered at a later time.

Each time a data frame is sent, the source device will wait for a certain amount of time for an acknowledgement frame before it considers the transmission attempt a failure. This retry wait time should be no less than the amount of time required under an immediate ACK policy for an acknowledgement to be made (e.g., the minimum time for an acknowledgement frame to arrive), and in the disclosed embodiment is greater than this time period. When the retry wait time is greater than the acknowledgement wait time, the extra time provides the source device with the time it needs to set up the retransmission of the data frame once it determines that an acknowledgment is not forthcoming.

However, for the final retry attempt, the source device may have to wait even longer before it can move on to transmit the next data frame. In one exemplary embodiment, if there is not an allowable retry attempt available, the source device must wait for the entire time period required for processing an acknowledgement frame, whether or not the acknowledgement frame is actually received. This immediate acknowledgement time includes a period of time that would allow an acknowledgement frame to arrive (an ACK time out), a period of time required to process an acknowledgement frame (an ACK duration), and a delay to allow the next data packet to be set up for transmission (a next packet delay).

During a retry attempt, the source device can cut off this immediate ACK time after the expiration of the retry wait time by resending the data frame. But when there are no retry attempts allowed, the source device must wait for the entire immediate ACK time before a new data frame can be sent.

However, once the last allowable retry attempt is made, the source device must move on to sending the next data frame whether or not the destination device received the current data frame or not. And so while information regarding whether that last retry of the current frame might be useful to the source device, such information will not alter its immediate operation. As a result, the time allocated for processing the immediate-ACK policy on the last allowed retry attempt could be considered wasted time that needlessly takes away from channel time that could be used for data transmission.

One way to eliminate this wasted time is to set the last allowed retry attempt for a given data frame to have a no-ACK policy rather than an immediate-ACK policy. With a no-ACK policy a source device need only wait a minimum wait time between sending one data frame and the next. This minimum wait time reflect the time necessary for the source device to physically prepare the next data frame for transmission.

Figure 3:
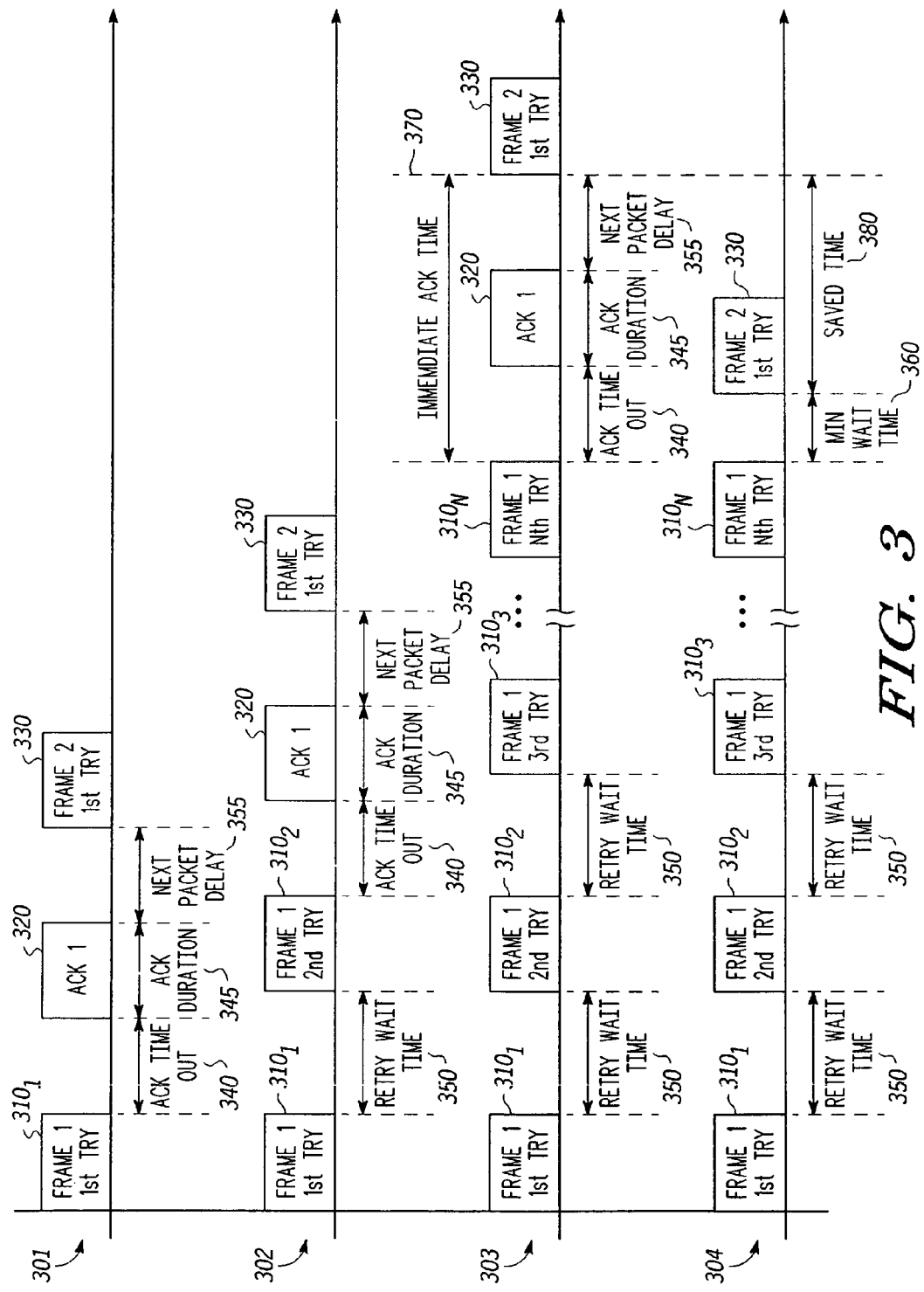
FIG. 3 is a block diagram of a method of resending data frames according to a disclosed embodiment of the present invention.

FIG. 3 is a block diagram of a method of resending data frames according to a disclosed embodiment of the present invention. In particular, FIG. 3 shows four examples of data transmissions between a source device and a destination device under four different transmission situations. The four examples are shown in the same time scale and orientation to indicate the relative lengths of time each set of data transmissions takes. Each of these examples shows the timing from the point of view of the transmitting (i.e., source) device.

In a first example 301, a data frame is successfully received after an initial transmission using an immediate-ACK policy. 301. In a second example 302, a data frame is successfully received after a first retransmission using an immediate-ACK policy. In a third example 303, a data frame is sent and then retransmitted N times using an immediate-ACK policy, but is never successfully received. And in a fourth example 304, a data frame is sent and then retransmitted N times using an immediate-ACK policy for all but the last retransmission, which uses a no-ACK policy. As with the third example 301, in the fourth example 304, the data frame is never successfully received.

In the examples 301-304 shown in FIG. 3, the initial transmission is referred to as the first transmission, and subsequent retransmissions are referred to as the $2^{nd}$ through $N^{th}$ transmissions. In this case (N−1) retries are allowed, or N total transmissions. An alternate embodiment could label the initial transmission as a $0^{th}$ transmission and the retransmissions as the $1^{st}$ through $N^{th}$ retransmissions, giving a total of N+1 transmissions.

In a first example 301, a data frame is successfully received after an initial transmission using an immediate-ACK policy. 301. In this example, a source device sends a first data frame to a destination device a first time $310_1$, and this data frame is successfully received.

After an ACK time out period 340 elapses after sending the first data frame the first time $310_1$, the source device receives an acknowledgement frame 320 from the destination device acknowledging receipt of the first data frame. Then after waiting for a next packet delay period 355, the source device sends a second data frame 330 to the destination device.

In a second example 302, a data frame is successfully received after a first retransmission using an immediate-ACK policy. In this example, a source device sends a first data frame to a destination device a first time $310_1$, which is not successfully received.

After waiting for a retry wait time 350, the source device transmits the data frame a second time $310_2$, also using an immediate-ACK policy. This time, after waiting for an ACK time out period 340, the source device receives an acknowledgement frame 320 from the destination device, acknowledging receipt of the second transmission $310_2$ (i.e., the first retransmission) of the first data frame, and having an ACK duration 345. Then after waiting for a next packet delay period 355, the source device sends a second data frame 330 to the destination device.

Although the second example 302 discloses that the first data frame is successfully received after the second transmission $310_2$, alternate examples could have up to N retry attempts used before a successful receipt. In such a case, each retry attempt will involve waiting for a retry wait time 350 and sending a new transmission of the first data frame, and the last, successful retry attempt will end with waiting for an ACK time out period 340, an ACK duration 345, and a next packet delay 355.

In a third example 303, a data frame is initially sent and then retransmitted (N−1) times using an immediate-ACK policy, but is never successfully received. Each time the source device transmits the data frame it does so using an immediate-ACK policy.

After each of the first through (N−1)$^{th}$ data frame transmissions for the first data frame $310_1$, $310_2$, $310_3$, etc., the source device waits for the retry wait time 350 before resending the first data frame the next time. The act of retransmitting the data frame allows the source device to cut short the immediate ACK procedure when it receives no acknowledgement frame.

However, after the $N^{th}$ transmission of the first data frame $310_N$, the protocol allows no more retries for sending the first data frame (i.e., it has reached the retry limit of (N−1)). As a result, the source device must wait for the entire immediate ACK time 370 before sending the second data frame 330. This delay includes the ACK time out period 340, the ACK duration 345 and the next packet delay time 355.

In a fourth example 304, a data frame is initially sent and then retransmitted (N−2) times using an immediate-ACK acknowledgement policy. When it is resent the $(N-1)^{th}$ time (i.e., the $N^{th}$ transmission total), however, it is sent using a no-ACK policy.

After each of the first through $(N-1)^{th}$ data frame transmissions for the first data frame $310_1$, $310_2$, $310_3$, etc., the source device waits for the retry wait time 350 before resending the first data frame the next time. As in the previous examples, the act of retransmitting the data frame allows the source device to cut short the immediate-ACK procedure.

However, after the $N^{th}$ transmission of the first data frame $310_N$, the protocol allows no more retries for sending the first data frame (i.e., it has reached the retry limit of (N−1)). But since this last transmission was sent using a no-ACK policy, the source device need not wait for an immediate ACK time 370 but need only wait for a minimum wait time 360 before sending the second data frame 330.

As a result, by using a no-ACK policy for the last retry attempt $310_N$, the source device in the fourth example 304 can save an amount of time equal to the immediate-ACK time 270 minus the minimum wait time 260.

The source device can then handle the first data frame as it would in the third example if no acknowledgement frame was received. As noted above, this can include determining that the frame transmission is a failure or rescheduling the frame for transmission at a later time.

In the IEEE 802.15.3 standard, the ACK time out period 340 and the next packet delay period 355 are both set to be a short inter-frame space (SIFS) of about 10 microseconds; the retry wait time 350 is set to be a retry inter-frame space (RIFS) of about 28 microseconds; the minimum wait time 360 is set to be a minimum inter-frame space (MIFS) of about 2 microseconds; and the ACK duration 345 is about 20 microseconds. This makes the immediate ACK time 370 that is allocated for the acknowledgement in an immediate ACK policy equal to about 20 microseconds.

But if the immediate ACK time 370 is replaced by the minimum wait time 360 for the last retry attempt for every data frame, then the saved channel time 380 for every frame that uses its maximum number of retry attempts will be equal to the immediate ACK time 370 minus the minimum wait time 360, or (40 microseconds−2 microseconds=38 microseconds.) If a large number of data frames require the maximum number of retries, this can save a significant amount of channel time.

In alternate embodiments the values for the ACK time out period 340, the ACK duration 345, the retry wait time 350, the next packet delay period 355, and the minimum wait time 360 can vary. However, so long as the minimum wait time 360 is less than the the immediate ACK time 370 (i.e., the sum of the ACK time out 340, the ACK duration 345, and the next packet delay 350), this method will save time.

Although the exact durations for each of these elements can vary, the ACK time out period 340 should be no greater than the retry wait time 350, and the minimum wait time 360 should be less than the immediate ACK time 370. In particular, the greater the difference between the immediate ACK time 370 and the minimum wait time 360, the more channel time will be saved for data transmission.

In addition, in some embodiments the number of allowable retries can be periodically modified (either during operation or by a user between transmissions) so that on average a large number of data packets successfully pass on the last retry attempt. This can help maximize the amount of time saved by using the disclosed process.

Channel Time Allocation

Figure 4:
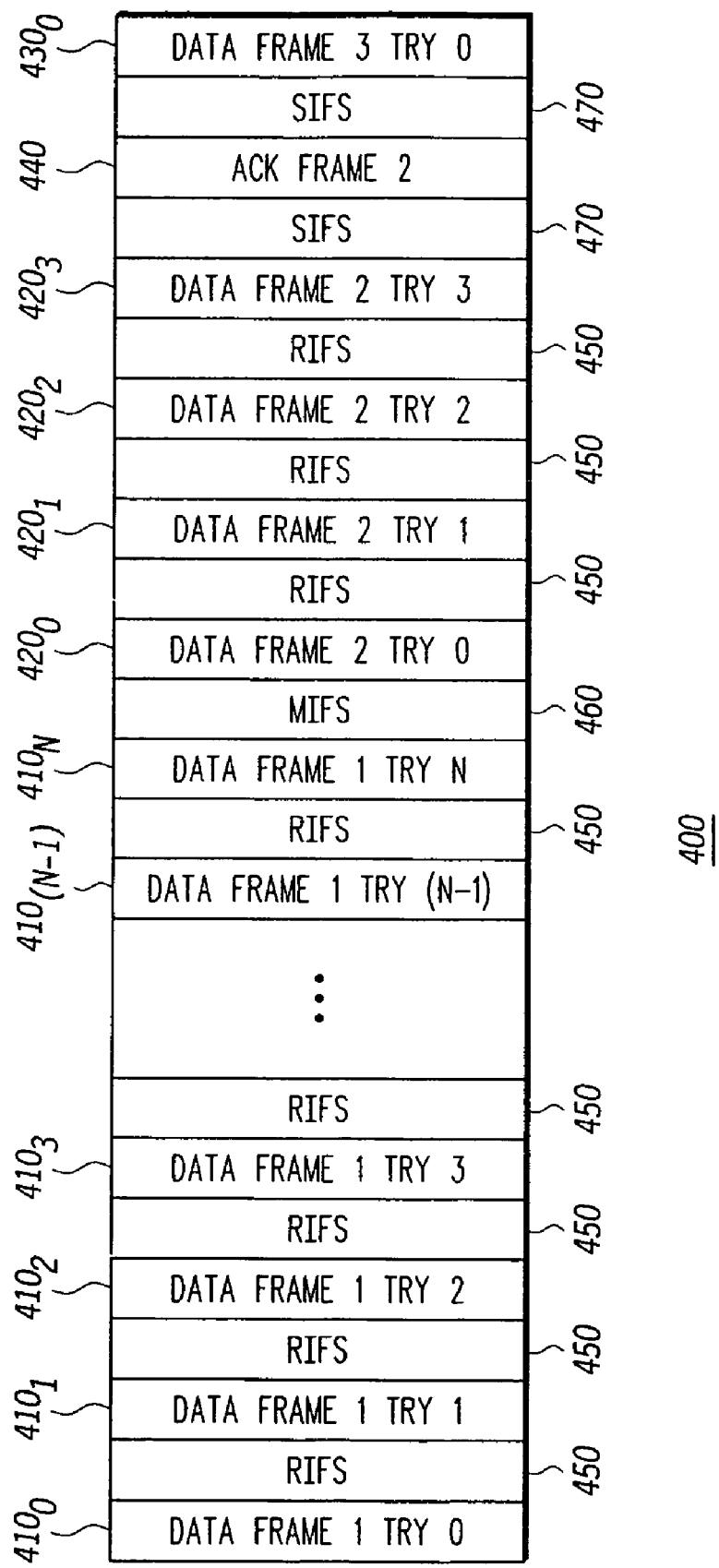
FIG. 4 is a block diagram of a channel time allocation that employs a method of resending data frames according to a disclosed embodiment of the present invention.

FIG. 4 is a block diagram of a channel time allocation that employs a method of resending data frames according to a disclosed embodiment of the present invention. This shows by way of example a time division multiple access (TDMA) channel time allocation scheme using the proposed IEEE 802.15. standard.

The channel time allocation of FIG. 4 illustrates how a channel time allocation could occur under the present claimed invention. In this particular example a first data frame is sent a maximum number of times and a second data frame is sent a lesser number of times than the retry limit. Alternate embodiments could vary the number, placement, and labels of particular blocks of time within the channel time allocation.

As shown in FIG. 4, the exemplary channel time allocation 400 includes transmissions of a first data frame 410, a second data frame 420, and a third data frame 430; transmission of an acknowledgment frame 440; and instances of a retry inter-frame space (RIFS) 450, a minimum inter-frame space (MIFS) 460, and a short inter-frame space (SIFS) 470. For this example the retry limit is N, where N is an integer.

In the exemplary channel time allocation 400 of FIG. 4, the first data frame is initially sent from a source device to a destination device using an immediate-ACK policy. In this embodiment the initial transmission is not counted against the retry limit, so it can be referred to as the $0^{th}$ transmission of the first data frame $410_0$.

In this example, no acknowledgement is received by the source device from the destination device within the time period defined by a RIFS 450 after the $0^{th}$ transmission of the first data frame $410_0$, so a first retransmission of the first data frame $410_1$ is made immediately after the RIFS 450, also using an immediate-ACK policy.

Similarly no acknowledgement is received within a RIFS 450 after the $1^{st}$ retransmission of the first data frame $410_1$, so a second retransmission of the first data frame $410_2$ is made immediately after the RIFS 450, also using an immediate-ACK policy. Likewise, no acknowledgement is received within a RIFS 450 after the $2^{nd}$ retransmission of the first data frame $410_2$, so a third retransmission of the first data frame $410_3$ is made immediately after the RIFS 450, also using an immediate-ACK acknowledgement policy. This continues until the $(N-1)^{th}$ retransmission of the first data frame $410_{(N-1)}$, which also uses an immediate ACK policy.

However, when the source device makes the $N_{th}$ retransmission of the first data frame $410_N$ (when the retry limit has been reached) the data frame is sent a final time $410_N$ using a no-ACK policy. As a result of this, the source device need only wait for a time period defined by a MIFS 460 to elapse before sending an initial transmission of a second data frame $420_0$ (i.e., a $0^{th}$ transmission of the second data frame). This initial transmission of a second data frame $420_0$ is sent using an immediate-ACK acknowledgement policy.

In this example, the source device receives no acknowledgment of the initial transmission of the second data frame $420_0$ or the first and second retransmissions of the second data frame $420_1$ and $420_2$. However, after the third retransmission of the second data frame $420_3$, the source device receives an acknowledgment frame 440, acknowledging receipt of the second data frame. This acknowledgment frame 440 is received a time period defined by a SIFS 470 after the third retransmission of the second data frame $420_3$.

Finally, after waiting for another SIFS 470 after the acknowledgment frame 440 is received, the source device sends an initial transmission of a third data frame 430$_0$ (i.e., a $0^{th}$ transmission of the third data frame) This initial transmission of a third data frame 430$_0$ is sent using an immediate-ACK acknowledgement policy. This transmission process can continue for as long as there is an available channel time allocation and data frames for the source device to send to the destination device.

Method of Operation

Figure 5:
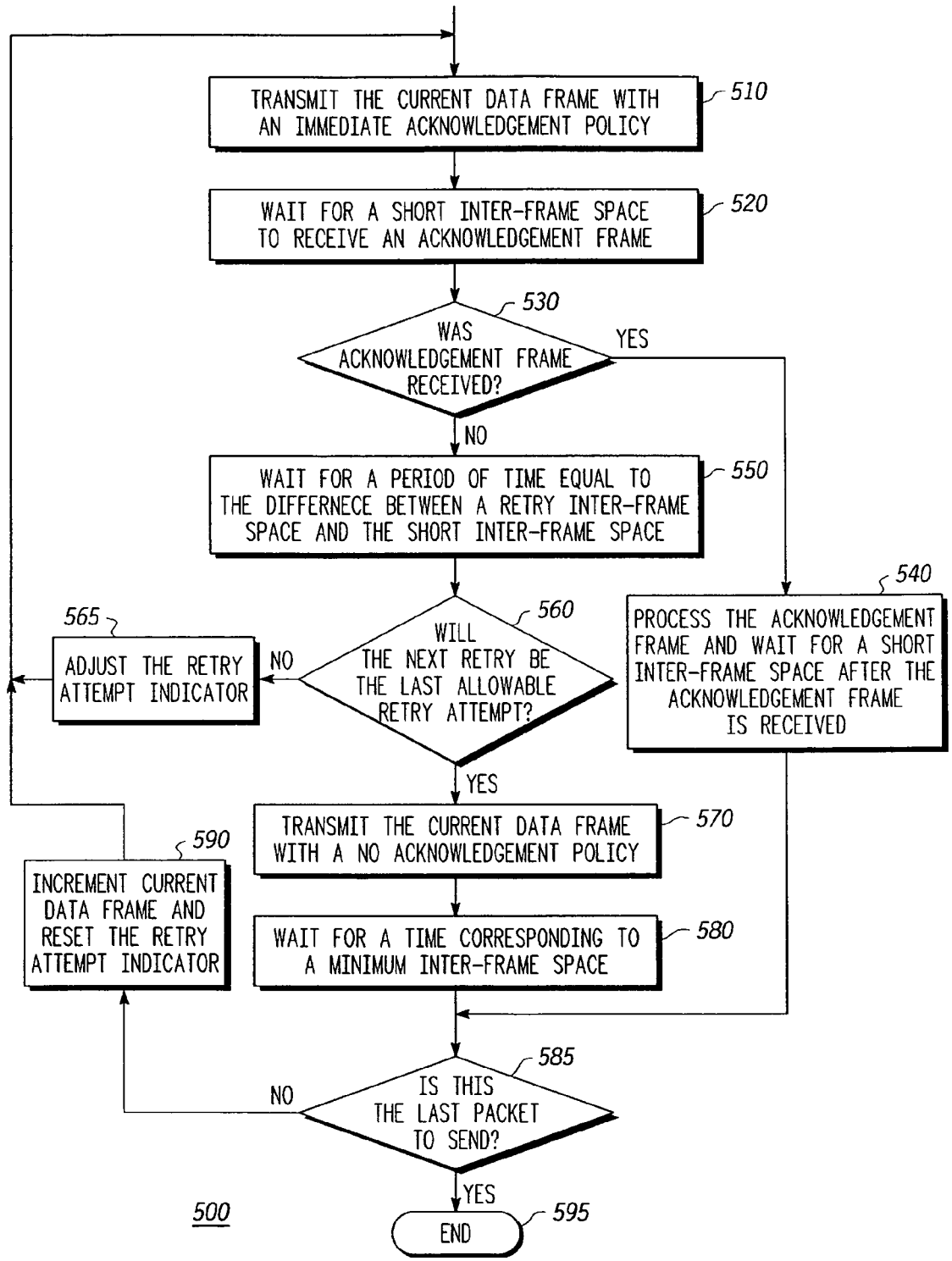
FIG. 5 is a flow chart of a method of resending data frames according to a disclosed embodiment of the present invention.

FIG. 5 is a flow chart of a method of resending data frames according to a disclosed embodiment of the present invention. As shown in FIG. 5, the process 500 starts when a source device transmits a current data frame to a remote destination device using an immediate-ACK policy. (510)

After transmitting the current data frame, the source device waits for a short inter-frame space (SIFS) to receive an acknowledgement frame from the destination device, indicating successful receipt of the current data frame. (520) Although the disclosed time for waiting for an acknowledgement frame is a SIFS in this embodiment, alternate embodiments could use a different time period.

The source device then determines whether the beginning of an acknowledgement frame was received from the destination device before the end of the SIFS. (530)

If an acknowledgement frame is received from the destination device indicating that the current data frame was successfully received, the source device processes the acknowledgement frame and waits for another SIFS after the acknowledgement frame is fully processed. (540) Again, although the disclosed wait time after an acknowledgement frame is a SIFS in this embodiment, alternate embodiments could use a different time period.

If, however, no acknowledgement frame was received, then the source device will wait for an additional period of time equal to the difference between a retry inter-frame space (RIFS) and a SIFS. (550) In effect, this means that the source device will have waited for a RIFS time period after sending the current data frame.

Once a RIFS time period has elapsed since sending the data frame, the source device then makes a determination as to whether the next retry attempt will be the last allowable retry attempt. (560)

If the next retry attempt is not the last allowable retry attempt, the source device will adjust the retry attempt indicator (565) and again transmit the first data frame using an immediate-ACK acknowledgement policy. (510)

In the disclosed embodiment a retry indicator is incremented to indicate total retry attempts. However, this operation can be implemented in a variety of ways. For example, a retry attempt indicator could be given a maximum value at the start and be decremented at each retry attempt.

If, however, the next retry attempt is the last allowable retry attempt, then the source device transmits the current data frame with a no-ACK policy (560) and then waits for only a minimum inter-frame-space (MIFS). (570) Although the disclosed time for waiting after the last retry is a MIFS in this embodiment, alternate embodiments could use a different time period.

Once either the source device has waited for a MIFS after sending the last retry (580) or has processed an acknowledgement frame and waited for a SIFS (540), the sending of the current data frame is ended and the source device will then determine whether it has any other data frames to send. (580)

If there are more data frames to send, the source device will set the new data frame as the current data frame and will reset the retry indicator (590). Then the source device will transmit the new current data frame with an immediate-ACK acknowledgement policy. (510)

If, however, there are no more data frames to send, processing of data frames will end. (595)

The decisions made in the process 500 of FIG. 5 (530, 550, 580) may be implemented in a variety of ways and still remain within the scope of the intended disclosure. For example, when determining whether an acknowledgement frame was received (530) the source device could make an explicit determination of this characteristic, or could proceed with a presumed determination that no acknowledgement frame was received absent a specific indicator from the destination device. Similar variations can be made with the other decision points.

One way of accomplishing the disclosed process is through a method of transmitting data from a transmitting device, comprising: transmitting a first data frame to a receiving device a first time; consecutively transmitting the first data frame to the receiving device second through $N^{th}$ times, each of second through $N^{th}$ first data frame transmissions being made a first predetermined time period after a respective previous first data frame transmission; and transmitting a second data frame to the receiving device a second predetermined time period after the $N^{th}$ first data frame transmission, wherein N is an integer greater than 1, and wherein the second predetermined time period is less than the first predetermined time period. In this method, (N−1) may be a maximum number of retry attempts allowed for a single data frame.

The method may further include determining whether an acknowledgment frame has been received from the receiver device after each of the first through $(N-1)^{th}$ first data frame transmissions.

The first predetermined time period may be greater than a waiting period allowed for the transmitting device to wait for an acknowledgement frame, but less than an acknowledgement period allowed for the transmitting device to process an acknowledgement frame, while the second predetermined time may be less than a waiting period allowed for the transmitting device to wait for an acknowledgement frame.

In particular, the first predetermined time period may be between 20 and 35 microseconds, while the second predetermined time period may be between 1 and 5 microseconds. More specifically, the transmitting device may be one of: an IEEE 802.11 compliant device and an IEEE 802.15.3b compliant device. In this case, the first predetermined time period may be a retry inter-frame space used in an IEEE 802.15.3 system, and the second predetermined time period may be a minimum inter-frame space used in an IEEE 802.15.3 system.

The first through $(N-1)^{th}$ first data frame transmissions are sent using an immediate acknowledgement policy, while the $N^{th}$ first data frame transmission may be sent using a no acknowledgement policy.

Another way of accomplishing the disclosed procedure is through method of transmitting data from a transmitting device, comprising: consecutively transmitting a first data frame to a receiving device N times using an immediate acknowledgment policy; transmitting a first data frame to a receiving device using a no acknowledgment policy after consecutively transmitting the first data frame to the receiving device N times using the immediate acknowledgment policy; transmitting a second data frame to the receiving device using an immediate acknowledgment policy after transmitting the first data frame to the receiving device using the no acknowledgment policy, wherein N is an integer greater than 0. In this method N may be a maximum number of retry attempts allowed for a single data frame.

The method may further include determining whether an acknowledgment frame has been received from the receiver device each time the first data frame is transmitted using an immediate acknowledgement policy. The transmitting device may be one of: an IEEE 802.11 compliant device and an IEEE 802.15.3b compliant device.

Yet another way of accomplishing the disclosed procedure is through method of A method of transmitting data from a transmitting device, comprising: transmitting a first data frame to a receiving device using an immediate acknowledgment policy; waiting a first predetermined time period after transmitting the first data frame using an immediate acknowledgement policy; determining whether a maximum retry limit will be reached by another transmission of the first data frame; repeating transmitting a first data frame to a receiving device using an immediate acknowledgment policy, waiting a first predetermined time period, and determining whether a maximum retry limit will be reached, as long as the maximum retry limit will not be met; transmitting a first data frame to a receiving device using a no acknowledgment policy, and waiting a second predetermined time period if the maximum retry limit will be reached; transmitting a second data frame to the receiving device using an immediate acknowledgment policy after transmitting the first data frame to the receiving device using the no acknowledgment policy, wherein the second predetermined time period is less than the first predetermined time period.

In this method, the first predetermined time period may be a retry inter-frame space used in an IEEE 802.15.3 system, while the second predetermined time period may be a minimum inter-frame space used in an IEEE 802.15.3 system. The maximum number of retries may be between 2 and 20, though any other suitable number of retries can be used.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of transmitting data from a transmitting device, comprising:

transmitting a first data frame from the transmitting device to a receiving device using an immediate acknowledgment policy;

waiting a first predetermined time period after transmitting the first data frame using an immediate acknowledgement policy;

determining whether a maximum retry limit will be reached by another transmission of the first data frame;

repeating transmitting the first data frame from the transmitting device to the receiving device using an immediate acknowledgment policy, waiting a first predetermined time period, and determining whether a maximum retry limit will be reached, as long as the maximum retry limit will not be met; and transmitting the first data frame from the transmitting device to the receiving device using a no acknowledgment policy, and waiting a second predetermined time period if the maximum retry limit will be reached;

transmitting a second data frame from the transmitting device to the receiving device using an immediate acknowledgment policy after transmitting the first data frame from the transmitting device to the receiving device using the no acknowledgment policy, wherein the second predetermined time period is less than the first predetermined time period.

2. A method of transmitting data from a transmitting device, as recited in claim 1, wherein the first predetermined time period is a retry inter-frame space used in an IEEE 802.15.3 system.

3. A method of transmitting data from a transmitting device, as recited in claim 1, wherein the second predetermined time period is a minimum inter-frame space used in an IEEE 802.15.3 system.

4. A method of transmitting data from a transmitting device, as recited in claim 1, wherein the maximum number of retries is between 2 and 20.

5. A method of transmitting data from a transmitting device, as recited in claim 1, wherein the first predetermined time period is a retry inter-frame space used in a wireless protocol.

6. A method of transmitting data from a transmitting device, as recited in claim 1, wherein the second predetermined time period is a minimum inter-frame space used in a wireless protocol.

7. A method of transmitting data from a transmitting device, as recited in claim 1, wherein the first predetermined time period is greater than a waiting period allowed for the transmitting device to wait for an acknowledgement frame, but less than an acknowledgement period allowed for the transmitting device to process an acknowledgement frame.

8. A method of transmitting data from a transmitting device, as recited in claim 1, wherein the transmitting device is one of: an IEEE 802.11 compliant device and an IEEE 802.15.3 compliant device.

9. A method of transmitting data from a transmitting device, as recited in claim 1, wherein the second predetermined time is less than an acknowledgement time required for the transmitting device to receive and process the first acknowledgment packet.

10. A method of transmitting data from a transmitting device, as recited in claim 9, wherein the second predetermined time is one of: a short inter-frame space and a minimum inter-frame space in a wireless protocol.

11. A method of transmitting data from a transmitting device, as recited in claim 1, wherein the first predetermined time is greater than a short inter-frame space in a wireless protocol, but less than an acknowledgement time required for the transmitting device to receive and process the first acknowledgment packet.

12. A method of transmitting data from a transmitting device, as recited in claim 1, further comprising:

waiting the first predetermined time period after transmitting the second data frame using an immediate acknowledgement policy;

determining whether the maximum retry limit will be reached by another transmission of the second data frame;

repeating transmitting the second data frame to the receiving device using an immediate acknowledgment policy, waiting the first predetermined time period, and determining whether the maximum retry limit will be reached, as long as the maximum retry limit will not be met;

transmitting the second data frame to the receiving device using a no acknowledgment policy, and waiting the second predetermined time period if the maximum retry limit will be reached; and transmitting a third data frame to the receiving device using an immediate acknowledgment policy after transmitting the second data frame to the receiving device using the no acknowledgment policy.

13. A method of transmitting data from a transmitting device, comprising:

transmitting a first data frame from the transmitting device to a receiving device using an immediate acknowledgment policy;

waiting a first predetermined time period after transmitting the first data frame from the transmitting device to the receiving device using an immediate acknowledgement policy;

determining whether the first data frame was acknowledged after the first predetermined time period;

waiting a second predetermined time period if the first data frame was not acknowledged;

determining whether a maximum retry limit will be reached by another transmission of the first data frame after the first and second predetermined time periods;

repeating transmitting the first data frame from the transmitting device to the receiving device using an immediate acknowledgment policy, waiting the first predetermined time period, determining whether the first data frame was acknowledged after the first predetermined time period, waiting a second predetermined time period if the first data frame was not acknowledged, and determining whether a maximum retry limit will be reached, as long as the maximum retry limit will not be met; and transmitting the first data frame from the transmitting device to the receiving device using a no acknowledgment policy, and waiting a third predetermined time period if the maximum retry limit will be reached;

transmitting a second data frame from the transmitting device to the receiving device using an immediate acknowledgment policy after transmitting the first data frame to the receiving device using the no acknowledgment policy, wherein the third predetermined time period is less than a sum of the first predetermined time period and the second predetermined time period.

14. A method of transmitting data from a transmitting device, as recited in claim 13, wherein the first predetermined time period is a short inter-frame space used in an IEEE 802.15.3 system.

15. A method of transmitting data from a transmitting device, as recited in claim 13, wherein the sum of the first predetermined time period and the second predetermined time period is a retry inter-frame space used in an IEEE 802.15.3 system.

16. A method of transmitting data from a transmitting device, as recited in claim 13, wherein the third predetermined time period is a minimum inter-frame space used in an IEEE 802.15.3 system.

17. A method of transmitting data from a transmitting device, as recited in claim 13, wherein the maximum number of retries is between 2 and 20.

18. A method of transmitting data from a transmitting device, as recited in claim 13, wherein the first predetermined time period is a short inter-frame space used in an IEEE 802.15.3 system.

19. A method of transmitting data from a transmitting device, as recited in claim 13, wherein the sum of the first predetermined time period and the second predetermined time period is a retry inter-frame space used in a wireless protocol.

20. A method of transmitting data from a transmitting device, as recited in claim 13, wherein the second predetermined time period is a minimum inter-frame space used in a wireless protocol.

* * * * *